Dec. 13, 1960

L. A. REYNOLDS 2,964,366

SEALS FOR HYDRAULIC RAMS

Filed Aug. 22, 1958

United States Patent Office 2,964,366
Patented Dec. 13, 1960

2,964,366

SEALS FOR HYDRAULIC RAMS

Lionel Arthur Reynolds, Bassetts Pole, Sutton Coldfield, Warwick, England, assignor to Tangyes Limited, Smethwick, England, a British company Filed Aug. 22, 1958, Ser. No. 756,672

Claims priority, application Great Britain Sept. 4, 1957

7 Claims. (Cl. 309—23)

This invention relates to improvements connected with seals for hydraulic rams of the kind wherein a sealing or packing ring is accommodated within a peripheral shoulder in the piston of the ram.

It is found in practice that due to the pressure of the hydraulic medium which is exerted on the sealing ring there is a tendency for the sealing ring to be extruded through the gap which obtains between the piston and the bore of the cylinder. This defect is more especially pronounced at high pressure of the hydraulic medium due to the large force to which the sealing or packing ring is subjected and due to the small but significant expansion in diameter of the cylinder. The present invention has for its object to overcome the aforesaid defect.

The invention consists of a hydraulic ram wherein the piston is provided with a peripheral shoulder which accommodates a rubber or like resilient gasket, characterised by the provision between the gasket and its seating face on the shoulder of the piston of a backing ring of two part construction comprising an expansible metal outer ring and a concentric resilient rubber or like inner ring, which inner ring may comprise an integral part of the sealing ring, such that hydraulic pressure exerted on the sealing ring is communicated to the inner backing ring which in turn effects a radial expansion of the outer metal backing ring into intimate contact with the bore of the cylinder to prevent the extrusion of the sealing ring through the gap between the piston and the cylinder.

In order that the invention may be clearly understood and readily carried into practice, reference may be had to the appended explanatory drawings, in which.

Figure 1:
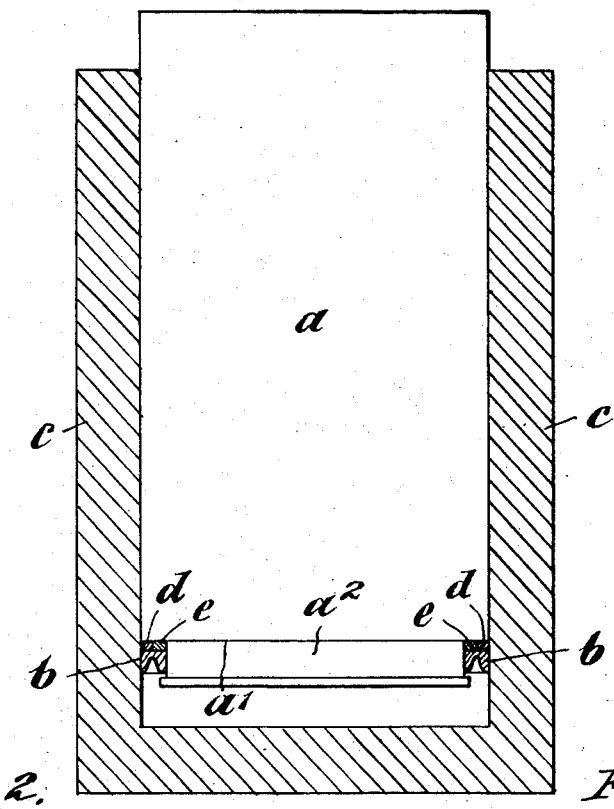
Fig. 1 illustrates in vertical sectional elevation a hydraulic ram having sealing means in accordance with the present invention.

The extent that a steel right cylinder subjected to internal fluid pressure bulges at any particular point varies under varying conditions. The greater the internal pressure; the greater the diameter of the cylinder at that point; the greater the axial distance of that point from a closed end of the cylinder; and the less the circumferential tensile strength of the cylinder wall, the greater the radial bulge will be at that point.

A steel plunger like that illustrated in the drawings of this application, when fitted within a cylinder, does not bulge significantly when applying, or being subjected to, pressure of fluid contained in the cylinder. Consequently a circular gap is opened between the plunger and the interior cylinder wall.

To prevent leakage of fluid through such gap readily deformable gaskets have been devised to be pressed by the fluid pressure around the juncture between the plunger and the cylinder. When subjected to very high pressure, however, the deformable materials of the gaskets themselves are liable to be forced into (or even extruded through) the gaps that have been opened between the respective plungers and the cylinders. The applicant's invention obviates the liability of gasket material to be forced into gaps that have been opened between plungers and interior cylinder walls by interposing rings of nonextrudable material between the gaskets and the junctures between plungers and cylinders so that the gasket materials are barred from entering the circular gaps. The rings of nonextrudable materials are slidable slightly upon shoulders extending in planes perpendicular to the axes of the plungers and the rings are held tightly against the shoulders by pressure. Pressure transmitted through the gasket to the inner side of the ring stretches the ring in somewhat the same way that the cylinder is stretched by internal pressure. The ring thus is pressed tightly against the shoulder and also is pressed tightly against the interior cylinder wall; the greater the pressure the more tightly the ring engages the shoulder and the inner wall of the cylinder and the more definitely it bars the gasket material from ingress into the gap.

In a convenient embodiment of the invention the inner end of the piston $a$ of a hydraulic ram is provided with a rectangular shoulder $a^1$ and piston head $a^2$ for the accommodation of a resilient rubber or like sealing or packing ring $b$ which may for example be of the commonly employed inverted channel or U-section which is adapted to be expanded into close sealing engagement with the wall of the cylinder $c$ of the ram by the pressure of the hydraulic medium. Between the flat base of the sealing ring $b$ and its registering or seating face $a^1$ on the shoulder of the piston there is provided a backing ring of two part construction comprising a rectangular section expansible metal outer ring having an outer diameter substantially equal to the bore of the cylinder, and an inner concentric ring $e$ which is also of rectangular cross section and occupies the whole of the space defined between the outer backing ring $d$, the sealing ring $b$ and the piston head $a^2$.

The inner backing ring $e$ is formed from a material, such as for example soft rubber, which will behave under pressure in a similar manner to that of a fluid inasmuch as the subjection of this ring to an axially directed force will result in the tendency of the ring to expand radially. This property is employed in this invention in order to communicate the force which is applied to the sealing or packing ring $b$ by the hydraulic medium to the outer expansible metal ring $d$ whereby the metal ring is radially expanded into intimate contact with the bore of the cylinder thereby to prevent any extrusion of the sealing ring through the gap between the piston and the cylinder.

Figure 2:
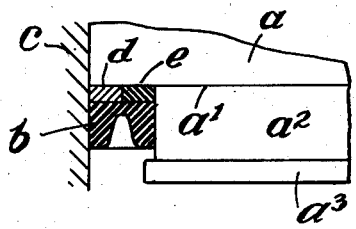
Fig. 2 is an enlarged fragmentary view of a portion of the structure shown at the lower right side of Fig. 1.
Figure 3:
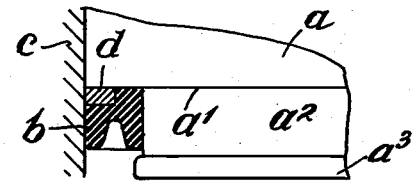
Fig. 3 is a similarly enlarged fragmentary view showing a slight modification of the elements shown in Fig. 2.

The inner and outer rings which constitute the backing ring may be bonded to one another or may be loosely associated (see Fig. 2). Alternatively the inner ring may form an integral part of the sealing or packing ring so that the sealing or packing ring is formed with a shoulder for the reception of the expansible metal ring (see Fig. 3). The piston head $a^2$ may be provided with a flange $a^3$ to assist in the location of the sealing ring $b$.

In summary the invention may be described as hydraulic ram apparatus which comprises a housing having an elongated regularly shaped passage formed therein and a plunger, having a transversely formed flat shoulder, slidably mounted within said passage. In hydraulic rams the housing is capable of bulging slightly when subjected to internal pressure thereby opening a slight gap between a wall of said housing and said plunger in the passage in which the plunger is slidably mounted. A perimetrical gasket is provided which extends around the margin of said flat shoulder and which engages the wall of said passage to prevent leakage of fluid between said passage wall and said plunger. A continuous nonextrudable member, shaped to conform to the wall of said passage, is interposed between said flat shoulder of said plunger and said perimetrical gasket. The continuous nonextrudable member has an aperture formed therein. The plunger has a piston head extending axially from said flat shoulder through said aperture of said nonextrudable member and within said perimetrical gasket. The piston head has a flange formed thereon to retain said perimetrical gasket on said piston head.

A concentric member of deformable material is confined within a space bounded by said flat shoulder, said piston head, said perimetrical gasket, and the interior of the aperture formed in said continuous nonextrudable member. The concentric member is adapted to transmit pressure transversely to the axis of said passage to elastically stretch said nonextrudable member into tight engagement with the wall of the passage in response to the exertion of fluid pressure upon the perimetrical gasket.

In conclusion it is pointed out that while the illustrated example constitutes a practical embodiment of my invention, I do not limit myself to the exact details shown since modification of the same may be made without departing from the spirit and scope of this invention.

I claim:

1. In hydraulic ram apparatus, in combination; a housing having a regularly-shaped passage formed therein about longitudinal axis; a plunger, having a transversely formed flat shoulder, slidably mounted within said passage; said housing being capable of bulging slightly when subjected to internal pressure and thereby opening a slight gap between a wall of said housing and said plunger in the passage in which the plunger is slidably mounted; a perimetrical gasket extending around the margin of said flat shoulder and engaging the wall of said passage to prevent leakage of fluid between said passage wall and said plunger; and a continuous nonextrudable member shaped to conform to the wall of said passage interposed between said flat shoulder of said plunger and said perimetrical gasket; said nonextrudable member having an aperture formed therein; said plunger having a piston head extending axially from said flat shoulder through said aperture and within said perimetrical gasket; a concentric member of deformable material confined within a space bounded by said flat shoulder, said piston head, said perimetrical gasket, and the interior of the aperture formed in said continuous nonextrudable member; said concentric member being adapted to transmit pressure transversely to the axis of said passage to elastically stretch said nonextrudable member into tight engagement with said wall of said passage in response to the exertion of fluid pressure upon said perimetrical gasket.

2. The combination defined in claim 1 in which said perimetrical gasket has a U-shaped cross-section.

3. The combination defined in claim 1 in which said perimetrical gasket and said concentric member of deformable material are formed together.

4. The combination defined in claim 1 in which said piston head has a flange formed thereon adapted to retain said perimetrical gasket on said piston head.

5. In a hydraulic ram, in combination; a cylinder having a substantially cylindrical interior wall; a plunger having a transversely formed flat shoulder slidably mounted within said cylinder, said cylinder being capable of bulging slightly when subjected to internal pressure and thereby opening a slight gap between said cylinder and said plunger; a circular gasket extending around the margin of said flat shoulder and engaging the interior wall of said cylinder to prevent leakage of fluid between said interior cylinder wall and said plunger; and a continuous nonextrudable ring interposed between said flat shoulder of said plunger and said circular gasket, whereby internal pressure acting through said circular gasket presses said non-extrudable ring tightly against said flat shoulder, said plunger having a piston head extending axially from said flat shoulder within said circular gasket; said piston head having a flange formed thereon to retain said gasket on said piston head; and an annulus of deformable material confined within a space bounded by said flat shoulder, said piston head, said circular gasket and the interior of said nonextrudable ring, whereby fluid pressure exerted upon said gasket is transmitted through said deformable annulus to elastically stretch said nonextrudable ring into tight engagement with the interior wall of said cylinder.

6. The combination defined in claim 5 in which said circular gasket has a U-shaped cross-section.

7. The combination defined in claim 5 in which said circular gasket and said annulus of deformable material are formed together.

References Cited in the file of this patent

UNITED STATES PATENTS

| | | |
|---|---|---|
| 2,383,959 | Dick | Sept. 4, 1945 |
| 2,509,436 | Isenbarger | May 30, 1950 |
| 2,677,581 | Taylor | May 4, 1954 |